Aug. 31, 1965 E. G. BAILEY 3,203,684
SOLID FUEL FURNACE
Original Filed Oct. 10, 1960 3 Sheets-Sheet 1
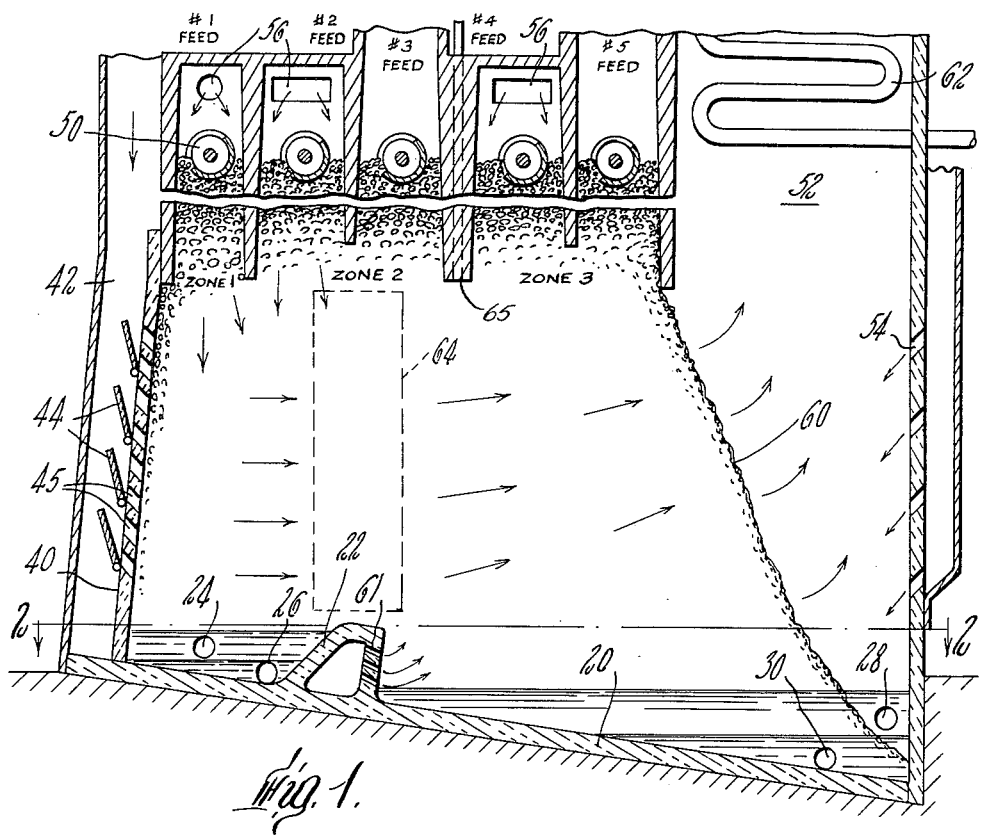
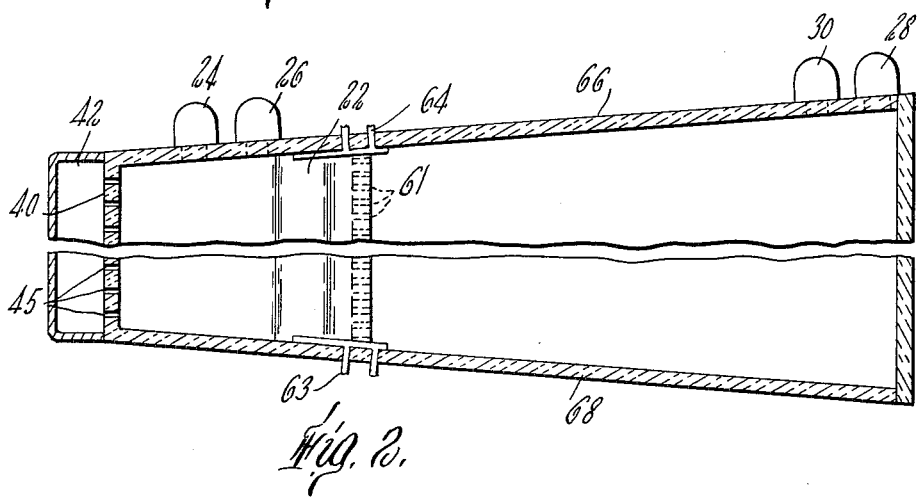

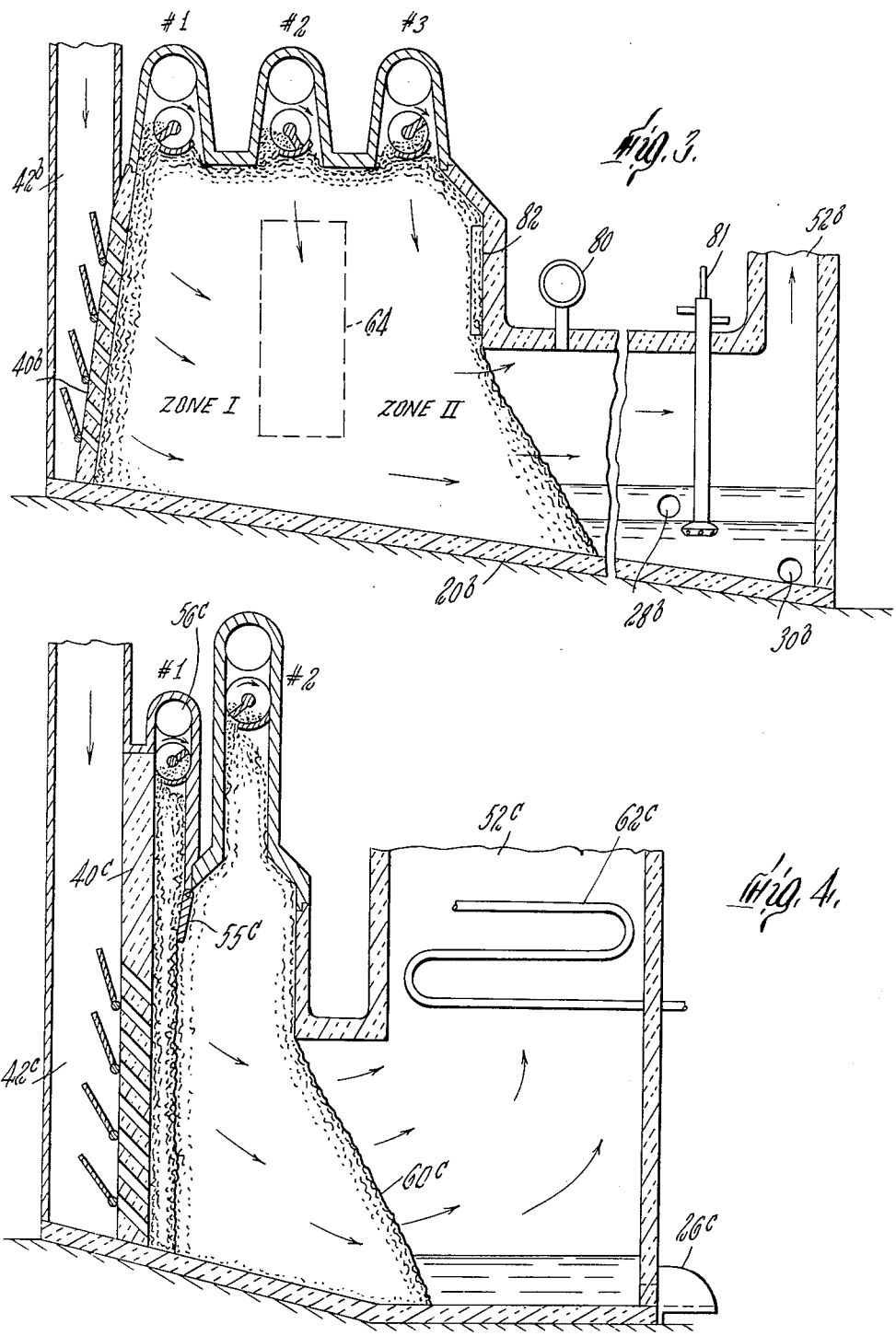

United States Patent Office 3,203,684
Patented Aug. 31, 1965

3,203,684
SOLID FUEL FURNACE
Ervin G. Bailey, Bethlehem Township, Pa., assignor to Bailey Inventions, Inc., Bethlehem Township, Pa., a corporation of Pennsylvania
Original application Oct. 10, 1960, Ser. No. 61,633. Divided and this application Feb. 13, 1962, Ser. No. 173,039
5 Claims. (Cl. 266—25)

This application is a continuation-in-part of my copending application Serial No. 817,143, filed June 1, 1959, now abandoned, consolidating therewith subject matter constituting a division of my copending application Serial No. 61,633, filed October 10, 1960, and is related to my application Serial No. 173,038, filed simultaneously herewith and constituting another division of my aforesaid application Serial No. 61,633.

This invention relates to apparatus for the production of clean gases, by the gasification of solid carbon-containing fuel, descending in a vertical fuel bed, for reactive agent or thermal purposes, for example, in a chemical reduction process, as in the reduction of iron ore, or in the production of high-temperature carbon monoxide- or carbon dioxide-containing gases for a variety of thermal uses.

Apparatus of this invention operates upon the principle of burning a vertically descending bed of solid organic fuel in such configuration and in such manner as to insure that the major gaseous reaction products formed in the bed, emerge from a surface of the bed other than the fuel-replenishing surface thereof. To this end, apparatus of this invention provides for the support of one side of a descending fuel bed by a gas pervious vertically extending refractory retaining wall. The opposite side of the fuel bed constitutes the off-gas surface and is defined, supported, and retained in substantially vertical position in juxtaposition with an adjacent vertically descending body containing a solid inorganic liquefiable material, chosen for its vertical flow characteristics at the operating temperature. The retaining body is constituted of materials which, in some cases, are wholly inert chemically to the gases generated in the fuel bed, and, in other cases, react, in whole or in part, with such gases; but, in all cases, the retaining body has a generally vertically extending off-gas surface. For this purpose, the furnace has a generally vertically extending wall in opposition to the pervious fuel bed retaining wall but spaced from the vertically extending off-gas surface of the juxtaposed beds and leading the off-gases to a stack or other exhaust conduit. Separate overhead feeds are provided, one adjacent the pervious wall for feeding organic fuel onto the top surfaces of the descending fuel bed, and one or more positioned laterally in advance of the stack for feeding properly chosen inorganic material onto the top surface of the retaining bed. The feed mechanisms, intermittent or continuous, are so controlled that the interface between the fuel bed and retaining bed can be substantially parallel to the rear refractory wall, whereby a fuel bed of substantially constant and predetermined thickness is continuously maintained. The apparatus includes means for feeding combustion-supporting gas, such as air, oxygen, or oxygen-enriched air, through the rear wall at suitable temperature and through the descending bed of fuel directly into the adjacent descending bed of inorganic material, and the composition and volume of the gas and the thickness of the fuel bed are controlled to cause, as desired, only incomplete oxidation of carbon in the solid fuel to carbon monoxide or to secure more complete combustion to carbon dioxide, or a combinatin of the two.

Because, in apparatus of this invention, the off-gas surface of the fuel bed is covered by the juxtaposed descending liquefiable material, such off-gas interface as well as the interior of the bed, along most of its height, may be maintained, when desired, at a temperature exceeding the liquid flowing point of the non-combustibles contained in the solid fuel and hence these non-combustibles, which at such temperatures are either themselves molten or part of a flowable eutectic, tend to drain downwardly through the fuel bed in liquid form and are thus gravity separated from the gaseous stream flowing transversely through the descending bed. This descending flow also acts in the manner or a gas washer to minimize unburned fuel particles proceeding with the gaseous reaction products produced in the fuel bed into the inorganic material.

In some cases, supplemental heat input may be provided to the beds from electrodes or from other strategically disposed subsidiary or supplemental solid fuel feeds. In other cases, steam may be introduced with the combustion-supporting gas to limit the upper temperature developed in the fuel bed.

The thickness of the retaining bed affects the temperature of the gases released at the off-gas surface of the retaining bed and is controlled according to the nature or temperature or both, of the off-gases desired.

Applying the principles of the invention to iron ore reduction, for example, great advantages accrue from using the apparatus with a sustaining vertically descending charge of iron oxide ore in admixture in varying proportions with solid fuel. When compared with the normal blast furnace, apparatus of this invention permits a novel arrangement of the burden, particularly with respect to the direction of flow of the combustion-supporting gas and gaseous reaction products relative to the flow of fuel, ore, metal, and slag. In apparatus of this invention, countercurrent flow of gaseous reaction products with respect to fuel and slag is avoided. Instead the apparatus permits cross flow of combustion-supporting reducing, and off-gases with respect to fuel feed, reduced metal removal, and slag removal.

In apparatus of this invention, the charge in effect is turned on its side so that the fuel, ore, and limestone are fed by gravity from the top side of the bed, the liquid non-combustibles and reduced metals flow by gravity in liquid form down through and out of the bottom of the bed and the gaseous flow is towards the off-gas surface which extends from the fuel and ore feed level generally vertically downwards towards the liquid-draining surface of the bed. The gaseous flow is maintained by introducing combustion-supporting gas from the back side of the bed opposite from the off-gas surface, and, if needed, from the top of the bed, though a certain amount of air or oxygen may be impinged upon the off-gas surface as will be hereinafter described.

Since relatively cool fuel and ore is not added to the charge at the off-gas surface, this surface may be maintained at a temperature exceeding that necessary to maintain a wet zone right up to the off-gas surface. The term "wet zone" signifies a zone in which non-fuel constituents (slag, ash) are largely or entirely in the liquid state as a result of high temperature, i.e., in excess of their highest melting temperatures.

With no counterflow of fuel with respect to gaseous reaction products, dust particles are no longer carried away with the off-gases. Since they must proceed through the bed, they are either fully consumed before they reach the off-gas surface, or they are bound by and carried downwardly with the always-liquid and free-to-flow-under-the-influence-of-gravity ash, preventing their escape at the off-gas surface. Since all the non-combustibles are maintained at such a high temperature throughout the bed, clinker clogging is effectively prevented.

As a result, the off-gases are thoroughly clean, though, because of their high temperature, they contain a store of heat far in excess of off-gases of conventional blast furnaces. Their cleanliness, however, compensates for lower thermal efficiency at this point, since clean gases may always be put to immediate productive use—costly reconditioning being unnecessary. Moreover, the excess sensible heat can be used for steam generation or other useful purposes.

For this reason, while the off-gas ratio $CO/CO_2$ is high—not less than 3:1 and often much greater—one may well afford to forego complete utilization of the CO content in advance of the off-gas surface by reason of the high chemical potential of the off-gases as a fuel for further combustion, as well as their high thermal potential because of their heat capacity and temperature.

An important additional effect is that the grate-to-off-gas-surface length of the bed is entirely independent of its vertical height and hence over-all weight. In fact, the bed may have any desired width and its length is governed solely by a determination of that required for continuous completion of the necessary reactions, while bearing in mind the desideratum of maintaining the off-gas surface at such a high temperature as will insure that all ash, slag, and metal drains off in a molten condition so as to maintain a wet bed which will act like a gas washer for unreacted particles, which, in the normal blast furnace, escape upwardly with the products of combustion in the form of smoke, soot, and cinders through the relatively cool off-gas surface of the blast furnace.

A correlative result is that the vertical dimension of the bed may be so limited that less costly and more abundant fuel may be used, as the mechanical strength of the fuel charge to insure porosity is of decreasing importance with decreasing bed height; and, as has already been described, the over-all weight of the charge in accordance with this invention is completely independent of the variables that control the height of burden in a blast furnace. The over-all weight of the charge is not restricted by the mechanical strength of the fuel.

It can thus be seen that certain of the formidable limitations and exacting requirements of present-day blast furnace operation have been overcome. In apparatus of this invention it is no longer essential to utilize costly selected quality fuel to insure porosity in the burden for proper gas transmission; there is no necessity for limiting the height of the burden to a weight consistent with the mechanical strength of the fuel; and expensive regenerative equipment and apparatus for cleaning and separating the dust- and cinder-laden gases with accompanying maintenance of their refractory linings is no longer necessary, and there is less likelihood of hang-up and clinker obstruction.

Applying the principles of the invention for purely thermal purposes, a suitably thick fuel bed is retained in order to produce essentially carbon monoxide, for example, at very high temperature as a source, upon secondary combustion, of carbon dioxide. Here the fuel bed sustaining charge may be, instead of reducible ore, essentially aggregate inorganic material which is chemically inert to carbon monoxide but which is slowly meltable and which has a melting point interval so chosen with respect to the temperature of operation of the fuel bed that the adjacent juxtaposed beds, though descending, will be geometrically confined to substantially constant dimensions. Such a material may, for example, be a slag cement clinker or a refractory aggregate which, as it melts, can be withdrawn and passed in heat-exchange relation with either the fuel or the combustion-supporting gas input.

Applying the principles of the invention for other thermal purposes, as in the production of clean gases having a substantial carbon dioxide content, the bed of organic material can be made thinner so that the off-gases will have a very high $CO_2/CO+CO_2$ ratio.

These and other objects of the invention will be more readily understood when taken in connection with the description of the accompanying drawings wherein:

FIG. 1 is a diagrammatic sectional view through an iron reduction furnace designed for operation in accordance with this invention, being broken away to indicate variation in height;

FIG. 2 is a schematic plan view, partly in cross-section, also broken away to indicate extent, of the furnace, taken along the line 2—2 of FIG. 1, omitting the bed contents;

FIG. 3 is a vertical cross section through a modified form of iron reduction furnace;

FIG. 4 is an illustration of a furnace similar to those in FIGS. 1 and 3, but not involving iron reduction operation.

Figure 5:
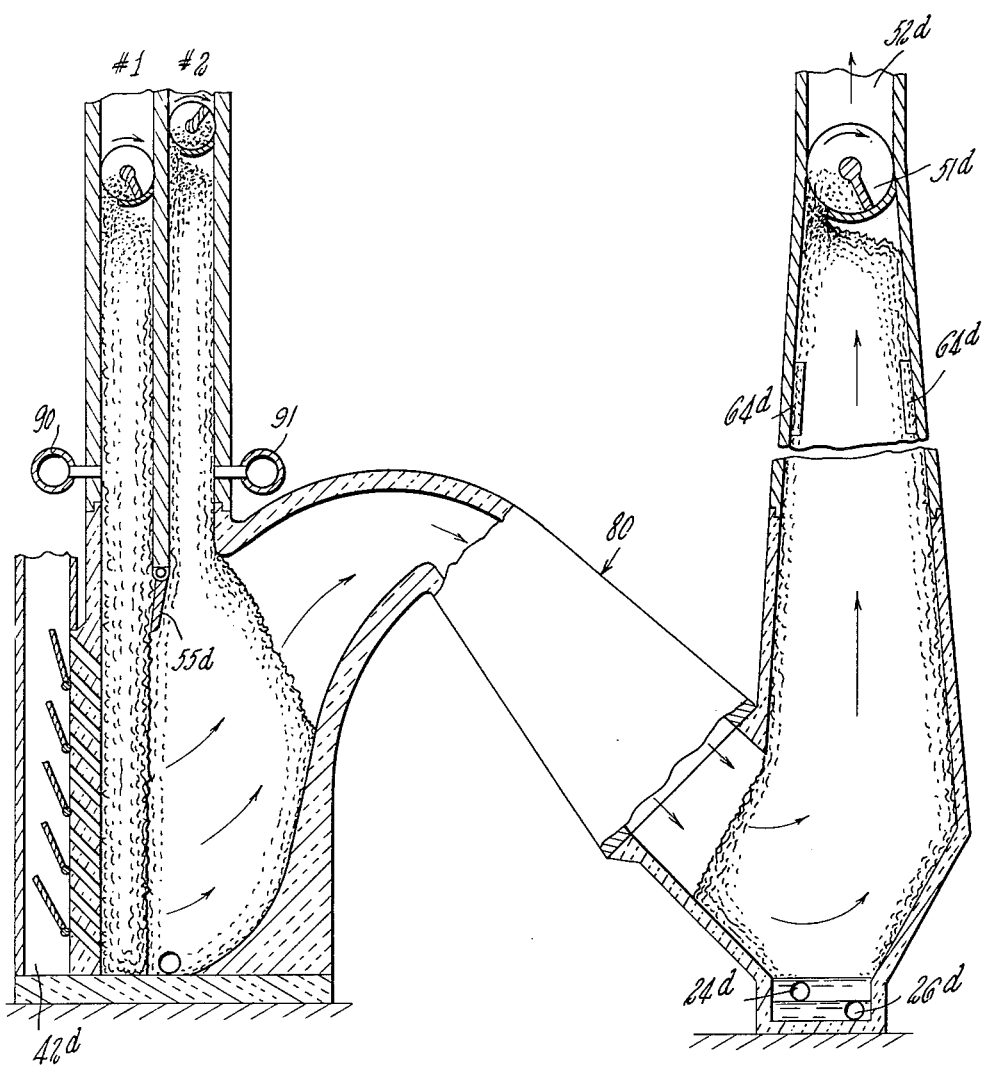
FIG. 5 is an illustration of a furnace similar to that of FIG. 4 wherein the off-gases from that furnace are fed through an electric generator zone to an iron reduction furnace.

FIG. 1 shows an apparatus which includes an inclined refractory supporting surface 20 separated by an upstanding dam 22 extending across the apparatus and provided at the sides with tap holes 24, 26, 28, and 30 for the removal of slag and reduced metal. The back of the apparatus takes the form of a refractory wall 40 of a plenum chamber 42 which communicates with a source of combustion-supporting gas, preferably oxygen, or oxygen-enriched air. A series of baffles 44 aid in directing the combustion-supporting gases into uniform, or rotherwise distributed, flow along the height of the wall through spaced apertures 45, provided by spacing refractory bricks both vertically and horizontally.

Arranged over the furnace chamber are a succession of fuel and ore feeds, each provided with a conventional feed mechanism for distributing the material in a continuous manner across the width of the furnace. The first feed 50 again located substantially over the rear portion of the furnace, is followed in succession by a series of four, in this case, additional feeds so that the particular content and/or rate of feed of material may differ at the various feeds.

At the far right in FIG. 1 there is a stack 52 for the off-gases and provision is made for the introduction of small amounts of gases such as air, or oxygen if desired, through a series of apertures 54.

Each of the compartmentalized feeds Nos. 1, 2, and 4 may also be provided with gas inlets 56 for preheating or combustion-supporting purposes. Feeds Nos. 3 and 5 may provide for exhausting gases, principally those, if any, introduced at feeds Nos. 2 and 4, respectively.

In this type of furnace the first feed is for predominantly solid fuel, with in some cases, scome iron ore and bauxite, followed by second, third, fourth, and fifth feeds of fuel, ore, and limestone in varying contents. If the iron ore is reasonably low in silica content (e.g., unsintered taconite) and has some calcium carbonate and the bauxite has a high alumina content, a molten calcium aluminate may be tapped at 24 and a high quality ferrosilicon at 26. Or laterites from Cuba and Jamaica may be fed at No. 1 feed to supply iron ore high in alumina.

The rear zone beneath the first feed operates to produce reducing gas in the form of carbon monoxide, and is held in position and overlaid with layers of successive vertical zones of ore, and/or ore, stone, and fuel in varying proportions.

With this form of furnace it is necessary that the reducing zone extend throughout the entire portion of the charge and hence sufficient endothermic heat has to be supplied throughout the bed to insure that the products of partial combustion do not fall below a temperature of about 2700–2732° F. and emerge from the inclined off-gas surface 60 of the bed at at least that temperature, since otherwise the ore fed at feed 5 would not be reduced.

Combination in the rich fuel zone of the bed adjacent the ingress of oxygen-enriched air produces a temperature higher than 4000° F. With preheating of the ore charges and combustion of the fuel supplied at the various feeds, supported in addition by the oxygen content of the ore, high temperature conditions can prevail throughout the bed. In addition, secondary air or oxygen may be introduced through air inlets 54 to aid in maintaining the off-gas surface temperature.

Further combustion-supporting gas may be introduced through inlets between the feed compartments, one of which is shown at 65, and at inlets 61 through dam 22 if necessary to secure continuous reaction in the portion of the bed to the right of dam 22.

The number of ore-fuel zones is limited only by the ability to maintain a reducing condition and a high temperature in the zone of each additional charge. Accordingly, in certain instances additional heat can be supplied by electrical input through carbon electrodes or a carbon-block lining. Such electrical energy can, if desired, be readily supplied from energy recovered from the products of combustion.

Thus, in an extreme case, the production of iron in accordance with this invention may be viewed as a by-product of power production from a novel synthesis gas producer utilizing low-cost solid fuels, all made possible by the herein described provisions for clean off-gases never heretofore provided in either the metal-oxide-reducing or the synthesis-gas-production arts.

As will be seen, in contrast with the burden of a conventional blast furnace whose vertical dimension must be limited in order to maintain air permeable structure, the weight of the burden in the reduction furnace shown in FIG. 4 is transverse to the blast flow. The height of the furnace may thus remain limited without restricting the volume of the burden. Since, however, in a conventional blast furnace the off-gases are at a temperature not substantially higher than 300° F., it will be seen that the much hotter off-gases from the present furnace are a comparably more valuable by-product and therefore must go to heat exchangers (shown at 62) or find other use in order to provide economical operation.

While all the iron from such a bed may be collected through a single tap, it may be desirable, and is within the contemplation of the operation of such a furnace, to have multiple taps, as shown in FIG. 1, since often there can be variation in the quality of the iron and of the slag withdrawn from the separate vertical zones of the unitary bed.

The electric power can be supplied to Zone 2 through electrodes 63, 64 shown in FIGS. 1 and 2, so that the bed is supplied with the heat equivalent to the kilowatts used. Three electrodes can be used with three-phase alternating current at a suitable voltage.

As shown in FIG. 2, it is contemplated that the bed may have flared side walls 66, 68 in order to accommodate the additional volumes of gas from the oxygen, ore, and limestone used either for combustion or preheating purposes.

Because of the entirely horizontal configuration of the bed in FIG. 1 requiring the hot off-gas surface 60 in Zone 3, fuel is required at the feeds Nos. 4 and 5 in order to maintain the carbon monoxide content and temperature high enough to accomplish the FeO to Fe reduction right up to the off-gas surface.

The fuel may be anthracite, coke, charcoal, dry wood, or any free-burning coal.

Oxygen is fed in at room temperature.

To start this furnace, preferably the walls and bottom are first warmed by burning gas therein. Zone 1 is then charged with coke having ash of low fusing temperature, or other suitable fuel, and either no iron ore or bauxite, or a lesser amount than normal, until suitable temperatures are attained, when the charge is proportioned to give satisfactory operating conditions.

The charge in Zones 2 and 3 can also be varied for start-up requirements and also from time to time during operation to meet variations in the fuel, ore, etc.

The electricity for Zone 2 can be supplied from a separate source until equilibrium is attained.

In fact, electric power from a regular outside supply may be used at all times when it is desired to utilize the heat in the off-gases for other purposes.

If low CO content gas only is present near the off-gas surface, satisfactory reduction of the $Fe_2O_3$ in the ore from feed No. 5 will not be secured. Hence additional carbon monoxide must be generated within the bed through the addition of some fuel beyond feed No. 1.

In the apparatus shown in FIG. 3, Zone 3 of FIG. 1 has in effect been omitted, and the feeds are confined to three in number. The dam 22 has been omitted since the over-all thickness of the beds is substantially decreased from that shown in FIG. 1, but electrodes 64 are still provided and additional electrodes 82 are furnished to provide sufficient heat to insure reducing conditions throughout without the necessary feed of further solid fuel at feeds Nos. 2 and 3.

In the operation of a furnace as shown in FIG. 3, something like 60% of the total available heat may be utilized in ore reduction, leaving about 22% available in the off-gases for the open-hearth, of which about 7% is sensible heat and 15% calorific heat developed by burning the CO off-gases and $H_2$ present with additional air or oxygen introduced through the inlets 80 and/or 81.

In this case, as in other cases, some natural gas containing $CH_4$ as a principal constituent may also be introduced as part of the gas flowing through the perforate rear wall 49b.

Calculations for operation of the furnaces shown in FIGS. 1, 2, and 3 are included in my copending application Serial No. 61,633, filed October 10, 1960, describing and claiming the methods involved in the operation of these furnaces, but are here omitted as not being essential to a description of the structure of the apparatus.

FIG. 4 illustrates an apparatus designed to use as a retaining bed for the downwardly descending fuel bed, an inorganic material that does not react with the fuel bed gaseous reaction products but merely provides the necessary support for maintaining a fuel bed of uniform horizontal thickness.

Free-burning solid fuel is fed at feed No. 1. The inorganic material fed at feed No. 2 may be bauxite rock, Lumnite (calcium aluminate prepared from bauxite and limestone), various silicates or other suitable inorganic material which can be melted as it descends at the operating temperature of the gases flowing from the fuel bed, for example at temperatures of 2700° F. or higher.

By supplying highly preheated air through plenum 42c to the fuel bed or by enriching the air with oxygen, practically complete combustion can occur in the fuel bed burning all the carbon to $CO_2$ and substantially all the hydrogen to $H_2O$, so that temperatures up to and exceeding 4000° F. can readily be produced. A pivoted gate 55c is provided just below fuel feed No. 1 to control the thickness of the fuel bed. The gate 55c will have to be water-cooled (not shown), and it should be understood that water-cooled screen tubes or other water-cooled structure may be utilized in partial or entire replacement of the refractory walls, as needed, both in FIG. 1 and in the other embodiments of the invention.

Some of the off-gases from the fuel bed may be drawn off at feed No. 2 in countercurrent flow with the incoming rock or other aggregate. Such preheating can cause a dissociation of carbonates present in the rock and complete other endothermic reactions before the rock descends below the control gate 55c and thereby prevent any cooling effect from reduction reactions in the portion of the rock bed which supports the fuel bed.

Similarly some preheated air may be introduced above the fuel bed at 56c for concurrent flow with the fuel so as to cause it to reach ignition temperature as it proceeds beyond the gate 55c.

Because the non-combustibles in both beds liquefy and flow downwardly in accordance with this invention, picking up any other unliquefied particles to be tapped at 26c, the gases emerging from the off-gas surface 60c are particularly clean and will comprise $CO_2$, $H_2O$, and such nitrogen as may have been present in the air supply.

As in the case of the furnace of FIG. 1, a heat exchange arrangement 62c may be positioned in the stack 52c.

By adjusting the gate 55c, the thickness of the fuel bed may be increased and so regulated with respect to the reactions taking place in the fuel bed as to provide the desired excess air.

As shown in FIG. 5, the thickness of the fuel bed may be so controlled that the off-gases will be very rich in CO and may be at a temperature (e.g., 2700° F.) to go directly to an iron reduction furnace, or they may be at a higher temperature (e.g., 5300° F.) either with or without after-combustion for utilization in a magnetohydrodynamic electric generator, illustrated diagrammatically at 80, after which their residual energy can be utilized for still other purposes. With no after-combustion the CO gas may still be introduced into the bottom of an iron reduction furnace charge as shown in FIG. 5, fed by feed mechanism 51d placed directly beneath stack 52d. Iron and slag can be tapped at 26d and 24d, respectively. Electrodes 64d are provided for supplementing the heat input when needed.

For securing very hot off-gases, the inorganic aggregate material fed at feed No. 2 in FIG. 5 has to be highly preheated so that only a small amount of sensible heat will be required to keep this retaining bed active and replaceable, the residue being tapped off. Accordingly FIG. 5 adds two air and gas inlets 90 and 91 to aid in preheating both the No. 1 fuel and the No. 2 inorganic aggregate feeds. Economic considerations control the use of either air, enriched air, or oxygen in the operation of the FIG. 5 fuel bed.

Arrows utilized in the drawings relate only to the flow direction of gases, as distinguished from fuels and liquids. Fuels used may be anthracite, coke, charcoal, dry wood, or any free-burning fuel.

Although specific embodiments of the invention have been described herein, it is not intended to limit the invention solely thereto, but to include all of the obvious variations and modifications within the spirit and scope of the appended claims.

What is claimed is:

1. A solid fuel furnace having a generally horizontally extending supporting surface and a generally vertically extending rear wall adapted to support a vertically descending charge with a front face of the charge exposed as a generally vertically extending off-gas surface, at least two laterally spaced overhead feeds having separate feed passageways for replenishing the vertically descending charge with different materials at each feed, the overhead feed adjacent said rear wall being adapted to feed combustible solid fuel on top of the vertically descending charge and the next adjacent feed being adapted to feed meltable material on top of said charge for vertical descent in juxtaposed side-by-side relation to and supporting fuel fed from said fuel feed, walls spaced laterally on the other side of said feeds from said rear wall forming a passageway separate from said feed passageways for leading gases away from said off-gas surface without encountering materials being fed to said furnace through said feed passageways, and means for conducting a blast of combustion sustaining gas through said rear wall transversely across said furnace through said descending charge, out of said off-gas surface and into said lead-away passageway.

2. A metal reduction furnace having a generally horizontally extending supporting surface and a generally vertically extending rear wall adapted to support a vertically descending charge with a front face of the charge exposed as a generally vertically extending off-gas surface, a succession of separate laterally spaced overhead feeds, each having a separate feed passageway for replenishing the vertically descending charge with solid fuel, iron ore, and limestone in varying proportions at each feed, the overhead feed adjacent said rear wall being adapted to feed solid fuel on top of the vertically descending charge and the next adjacent feed being adapted to feed iron ore and limestone on top of said charge for vertical descent in juxtaposed side-by-side relation to and supporting fuel fed from said fuel feed, a stack spaced laterally on the other side of said feeds from said rear wall and forming a passageway separate from said feed passageways for leading gases away from said off-gas surface without encountering materials being fed through said feed passageways and means for conducting a blast of combustion-sustaining gas through said rear wall transversely across said furnace through said descending charge, out of said off-gas surface into said stack passageway.

3. A metal reduction furnace as claimed in claim 2 having taps spaced laterally across the bottom of said furnace for withdrawing molten material accumulating in at least part of said charge separately from molten material accumulating in the remainder of said charge.

4. A metal reduction furnace as claimed in claim 3 having means for conducting combustion-sustaining gas from beneath said charge into said charge beyond at least one of said taps.

5. A metal reduction furnace as claimed in claim 1 wherein the supporting surface is inclined downwardly away from said rear wall, said furnace having means beyond said overhead feeds for collecting liquefied iron, as it runs down said inclined surface, in a pool at the bottom of said furnace, and means for aerating the liquefied iron in said pool.

References Cited by the Examiner
UNITED STATES PATENTS

| | | | |
|---|---|---|---|
| 900,291 | 10/08 | Meissner | 266—25 |
| 1,334,310 | 3/20 | Mace | 266—25 |
| 1,507,740 | 9/24 | Kirby | 75—41 |
| 1,877,123 | 9/32 | Bunce | 75—86 X |
| 1,895,284 | 1/33 | Hay. | |
| 1,984,747 | 12/34 | Klencke | 75—89 |
| 2,143,905 | 1/39 | Ahlmann | 266—21 |
| 2,307,459 | 1/43 | Greenwalt | 75—40 |
| 2,345,067 | 3/44 | Osann | 266—20 X |
| 2,846,301 | 8/58 | Greenwalt | 75—40 |
| 2,846,302 | 8/58 | Greenwalt | 75—40 |

OTHER REFERENCES

Iron and Steel, 3rd edition, pages 161–162. Edited by Tieman, published in 1933 by McGraw-Hill Book Co., New York.

JOHN F. CAMPBELL, *Primary Examiner.*

DAVID L. RECK, MORRIS O. WOLK, *Examiners.*